United States Patent [19]

Joshi

[11] 4,304,764

[45] Dec. 8, 1981

[54] PROTECTIVE ACTIVE NITRIDES AS ADDITIVES TO NONAQUEOUS CATHODE MATERIALS

[75] Inventor: Ashok V. Joshi, Fishkill, N.Y.

[73] Assignee: Ray-O-Vac Corporation, Madison, Wis.

[21] Appl. No.: 190,195

[22] Filed: Sep. 24, 1980

[51] Int. Cl.$^3$ .................................................. C01G 45/02
[52] U.S. Cl. ..................................... 423/593; 423/594; 423/595; 423/596; 423/598; 423/518; 423/599; 252/182.1
[58] Field of Search ............... 429/218, 224, 221, 194, 429/197; 423/593, 599, 594, 595, 596, 597, 598, 511, 518, 560, 517; 252/518–521, 182.1

[56] References Cited

U.S. PATENT DOCUMENTS

| | | | |
|---|---|---|---|
| 2,562,705 | 7/1951 | Ellestad et al. | 423/599 |
| 4,027,004 | 5/1977 | Sleight | 423/593 |
| 4,133,856 | 1/1979 | Ikeda et al. | 423/599 X |
| 4,246,253 | 1/1981 | Hunter | 429/224 X |

*Primary Examiner*—Anthony Skapars
*Attorney, Agent, or Firm*—Raymond J. Kenny; Francis J. Mulligan, Jr.

[57] ABSTRACT

A method for preparing stable non-stoichiometric cathode material to provide cathodes useful in non-aqueous electrochemical cells having an active metal (eg. lithium) anode. The method comprises reducing the non-stoichiometric cathode material (eg. manganese dioxide) with the active metal or a precursor compound of said active metal to form a compound of the active metal and stoichiometric active cathode material.

8 Claims, No Drawings

PROTECTIVE ACTIVE NITRIDES AS ADDITIVES TO NONAQUEOUS CATHODE MATERIALS

The present invention is concerned with cathodes and, more particularly, with cathodes useful in non-aqueous electrochemical cells having active metal anodes.

PROBLEM

It is known to use non-stoichiometric compounds such as manganese dioxide and ferrous sulfide as cathodes in non-aqueous electrochemical cells having active metals, particularly lithium, as anodes. Quite often, such cells exhibit anomalously high open circuit voltages and high initial discharge voltage plateaus as compared to equilibrium open circuit voltages. It is deemed advantageous to provide a means whereby stable cathodes utilizing such non-stoichiometric compounds can be prepared.

DISCOVERY AND OBJECTS

It has now been discovered that cathodes made starting with non-stoichiometric compounds can be stabilized by means of a partial reduction using as the reductant the active metal employed in the cell in which the cathodes will be used.

It is an object of the present invention to provide a process of preparing cathodes or cathode masses from non-stoichiometric compounds.

Another object of the invention is to provide novel cathodes or cathode masses so produced.

Other objects and advantages will become apparent from the following description.

GENERAL DESCRIPTION

The present invention contemplates a process for producing a stable cathode mass for use in a non-aqueous electrochemical cell having an active metal anode comprising reducing, in-situ, a non-stoichiometric active cathode material having at least two elemental components to eliminate non-stoichiometry by means of a conductive reductant from the group of said active metal and precursors of said active metal to produce, in-situ, a compound of said active metal with at least one elemental component of the non-stoichiometric active cathode material and, at most, 40% of reduced chemical specie.

The invention also contemplates stabilized cathodes or cathode masses made by the aforedescribed process and comprising a mass of stoichiometric active cathode material in intimate contact with in-situ-formed reduced chemical species and a compound of at least one elemental constituent of said non-stoichiometric active cathode material and an active metal. The reduced chemical species in the cathode mass of the present invention and resulting from chemical reduction of the original non-stoichiometric cathode active material is present in an amount no greater than about 40 percent of the original starting non-stoichiometric material.

Materials which are usually non-stoichiometric and which can be used as the non-stoichiometric active cathode material in the process of the present invention include manganese dioxide, iron sulfide, tungsten oxide, titanium disulfide and chromium trioxide. To the extent that in this description these starting materials are referred to by stoichiometric formulae, eg. $MnO_2$, FeS and the like, this is merely for the sake of convenience and does not indicate anything contrary to the scope of this general description.

Active metals useful in non-aqueous electrochemical cells of the kind in which the novel cathodes of the present invention can be employed include, in general, the alkali metals and the alkaline earth metals. Advantageously the active metal employed is lithium. As is well known to those skilled in the art, the use of lithium provides to a non-aqueous electrochemical cell high energy density as well as reasonably good electrolytic conductivity through use of solutions or layers of lithium salts as electrolytes. For these reasons, lithium is used in this specification for descriptive purposes. As used in this specification and claims, the term "precursor of an active metal" means any compound, mixture or alloy of the active metal, eg. lithium, which will act in the same manner as the active metal as a reductant. In the case of lithium, precursors such as $Li_3N$, $Li_3Bi$, aluminum-lithium alloy, $Li_5Si$ and $Li-Al_2O_3$ mixtures are advantageous in that they reduce non-stoichiometric active cathode materials in the same manner as the pure metal and are more readily obtained in fine powder form for blending with powdered cathodes material than is lithium metal per se. Among use of these precursors, the use of $Li_3N$ is deemed even more advantageous in that, during reduction, nitrogen gas is released. Nitrogen gas inhibits the reoxidation of reduced chemical species during reduction and allied processing. Furthermore, any $Li_3N$ not employed in reduction functions as a highly efficient ionic conductor raising the rate capability of the cathode.

Under ordinary circumstances, the reduction process of the present invention involving reduction of up to about 40% of the originally available non-stoichiometric active cathode material is carried out in the solid or quasi-solid state. Appropriate amounts of non-stoichiometric material and reductant are blended and ground together as powders along with conductivity enhancers (eg. carbon), if necessary. The blended powders are then compacted and subjected to a temperature at which the reduction will take place and below that temperature at which either melting or decomposition of the non-stoichiometric material takes place. The compacted powders are held at reduction temperature for a period of time sufficient for completion of reaction. Upon cooling, the resultant mass now containing stoichiometric active cathode material, reduced chemical species thereof, active metal compound and, optionally, conductivity enhancer is then formed into a cathode by conventional means, for example by regrinding and compaction under pressure. The compound of active metal with at least one elemental component of the non-stoichiometric active cathode material, eg. $Li_2O$, $Li_2S$, $LiMnO_2$ remains in intimate contact with the stoichiometric active cathode material in the reground and compacted final cathode mass.

In order to retain as much as practical of the capacity of the original starting non-stoichiometric cathode active material, it is advantageous in the process of the present invention to limit the amount of the solid, electronically conductive reductant to amounts which will reduce only about 5% to 20% of the non-stoichiometric material and carry reduction heating to as near completion as possible. Alternatively one can use larger amounts of reductant and limit the degree of reduction reaction attained during the reducing process. Whatever way one chooses to carry out the process, the final product should contain, on a mole basis, a predominate amount of stoichiometric active cathode material. Advantageously the mole ratio of stoichiometric active cathode material to reduced specie should be at least 3/2 and, even more advantageously, at least 4/1.

PARTICULAR DESCRIPTION

In order to give those skilled in the art a greater appreciation and understanding of the invention the following examples are given:

EXAMPLES

Ten parts by weight of non-stoichiometric FeS and 0.75 part by weight of $Li_3N$ were mixed and ground together in a dry, inert atmosphere. The ground mixture was then heated under dry, inert conditions at 450° C. for one hour. After cooling, the resultant solid block of cathode mass was broken down to powder form and pressed into pellets under an applied pressure of about 73 kg/mm$^2$. Similar pellets were produced using ten parts by weight of non-stoichiometric FeS and 0.9 parts by weight of $Li_3N$. Comparative cathode pellets were made by compressing the non-stoichiometric FeS.

These pellets were introduced as cathodes into electrochemical cells all of similar construction having lithium metal anodes, glass mat separators and electrolytes comprising a 1.2 molar solution of $LiAsF_6$ dissolved in a mixture of 40% propylene carbonate and 60% dimethoxyethane. The initial open circuit voltages (OCV) and OCV after periods of time are set forth in the following Table.

TABLE

| Example No. | Type of Cathode | Initial OCV | Time Period (Hrs) | OCV after time period |
|---|---|---|---|---|
| 1 | FeS + 7.5% $Li_3N$ (Reacted) | 1.772 | 75.5 | 1.798 |
| 2 | " | 1.778 | " | 1.826 |
| 3 | " | 1.779 | " | 1.823 |
| 4 | " | 1.784 | " | 1.830 |
| 5 | " | 1.773 | " | 1.819 |
| 6 | " | 1.775 | " | 1.820 |
| 7 | FeS + $Li_3N$ (Reacted) | 1.874 | 92 | 1.875 |
| 8 | " | 1.871 | " | 1.873 |
| 9 | " | 1.876 | " | 1.875 |
| 10 | " | 1.869 | " | 1.869 |
| 11 | " | 1.868 | " | 1.868 |
| 12 | " | 1.865 | " | 1.864 |
| 13 | " | 1.882 | " | 1.879 |
| A | FeS | 2.984 | 116.5 | 2.911 |
| B | " | 2.920 | " | 2.755 |
| C | " | 2.994 | " | 2.846 |
| D | " | 2.922 | " | 2.918 |
| E | " | 2.993 | " | 2.631 |
| F | " | 3.008 | " | 2.936 |
| G | " | 3.008 | " | 2.943 |
| H | " | 2.986 | " | 2.969 |

The data in the Table shows that cathodes of Examples, through 13 in accordance with the invention are more stable than the cathodes of comparative tests A through H not in accordance with the invention.

EXAMPLE 14

A manganese dioxide cathode material in accordance with the present invention is made by reacting together non-stoichiometric manganese dioxide and lithium nitride to carry out, with respect to less than 50% of the starting non-stoichiometric manganese dioxide, a reaction expressable in the following equation form:

$$2Li_3N + 2MnO_2 + x \rightarrow 2x(Li_2O) + 2(3-2x)LiMnO_2 + 4(x-1)MnO_2 + N_2$$

wherein x is the molar excess of oxygen beyond the stoichiometric amount required for $MnO_2$. The resultant cathode mass contains, in addition to stoichiometric $MnO_2$ and lithium compounds, an amount of carbon such as usually employed to enhance the conductivity of manganese dioxide masses.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for preparing a stable cathode mass for use in a non-aqueous electrochemical cell having an active metal anode comprising reducing, in-situ, a non-stoichiometric active cathode material having at least two elemental components by means of a conductive reductant from the group of said active metal and a precursor of said active metal to produce, in-situ, a compound of said active metal with the elemental component of said non-stoichiometric active cathode material in excess, stoichiometric cathode active material and, at most 40 percent, based on non-stoichiometric starting material, of chemical species resulting from the reduction of said active cathode material.

2. A process as in claim 1 wherein the non-stoichiometric cathode active material is selected from the group of $MnO_2$, FeS, $WO_3$, TiS and $CrO_3$.

3. A process as in claim 1 wherein the active metal is lithium.

4. A process as in claim 1 wherein the reductant is $Li_3N$.

5. A process as in claim 2 wherein the non-stoichiometric cathode active material is $MnO_2$.

6. A process as in claim 5 wherein non-stoichiometrical $MnO_2$ is reduced by $Li_3N$.

7. A process as in claim 2 wherein the non-stoichiometric cathode material is FeS.

8. A process as in claim 7 wherein non-stoichiometric FeS is reduced by $Li_3N$.

* * * * *